UNITED STATES PATENT OFFICE.

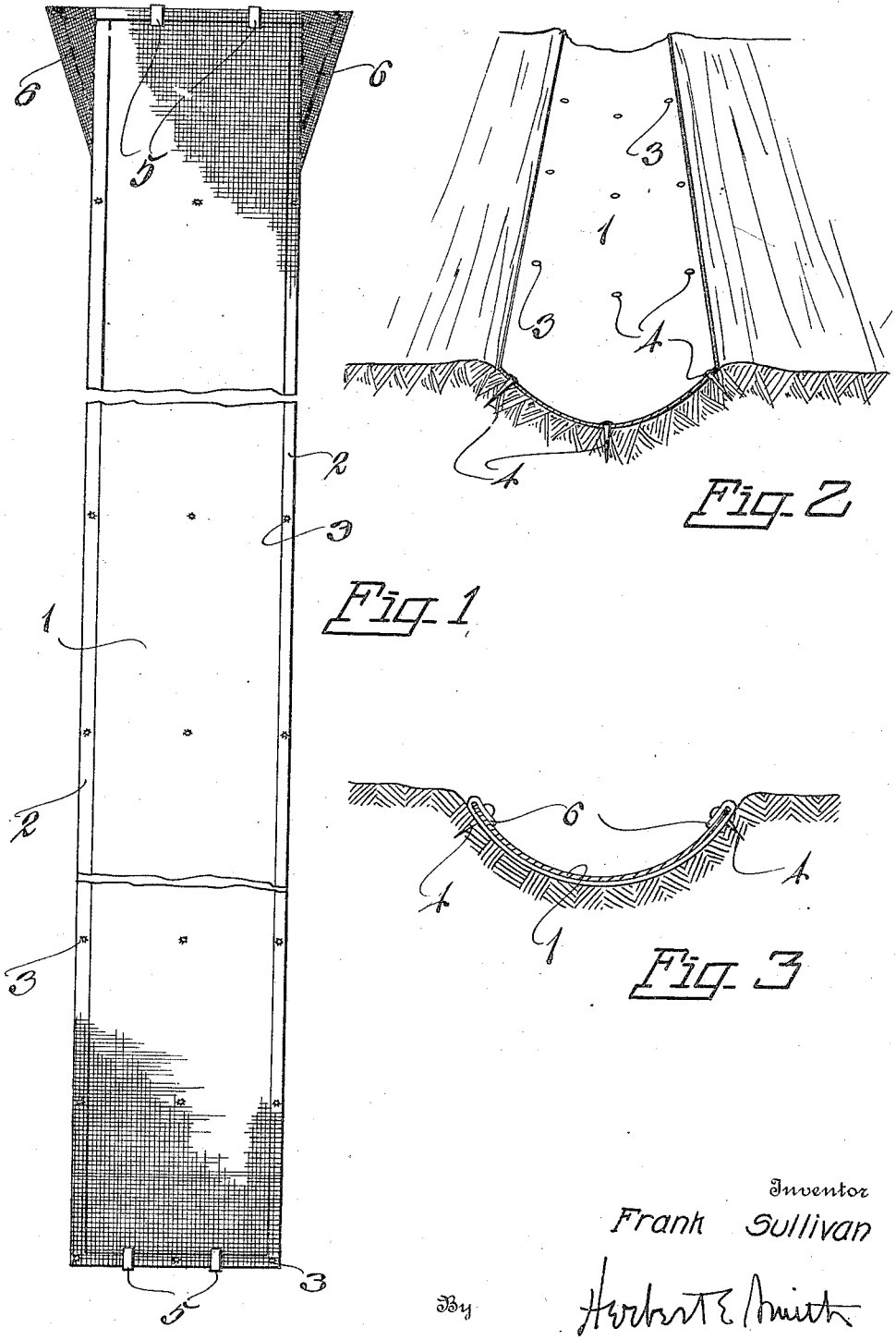

FRANK SULLIVAN, OF CUSICK, WASHINGTON.

IRRIGATION-DITCH LINING.

1,363,690.  Specification of Letters Patent.  Patented Dec. 28, 1920.

Application filed October 9, 1919. Serial No. 329,565.

*To all whom it may concern:*

Be it known that I, FRANK SULLIVAN, a citizen of the United States, residing at Cusick, in the county of Pend Oreille and State of Washington, have invented certain new and useful Improvements in Irrigation-Ditch Linings, of which the following is a specification.

The present invention relates to an improved irrigation ditch lining designed primarily for use as a protector or shield to prevent erosion, or washing away of the soil in irrigation ditches occurring in light soil. The lining is particularly applicable for use in main ditches of the irrigation system, where it is required that the main stream of water be conveyed for disposal through lateral ditches, and the subject matter of the invention is also applicable for use in the lateral ditches of the irrigation system where it is not only desirable that the water be conveyed, but also desirable that the water be permitted to seep through the lining for the purpose of irrigating the soil adjacent thereto.

The invention contemplates the utilization of a flexible lining in the material of which the porosity may be varied and providing a lining that may be pervious or impervious as the circumstances warrant in connection with the different form of ditches in which the lining is used.

In the accompanying drawings in which the physical embodiment of the invention is illustrated—

Figure 1 is a plan view of a section of the lining embodying the subject matter of the present invention.

Fig. 2 is a sectional view in perspective showing the lining in use.

Fig. 3 is a sectional view of the lining at a lap joint.

In the preferred form of the invention the ditch lining is made up of sections as indicated by the numeral 1, which are made of flexible material, of suitable width to fit in the usual size lateral or furrow employed in irrigation systems, and this lining forms a trough in the furrow or ditch through which the water may flow without likelihood of erosion or washing away the soil.

Along the edges of the flexible lining material hems or binding tapes 2 are provided through which are fashioned openings with eyelets 3 therein, and through these eyelets, which are spaced at regular intervals, are driven stakes or spikes 4 to secure the lining material in the ditch or furrow.

At the ends of the lining sections are provided weights 5, 5, for holding down the ends or edges of the sections, and preferably one end at least of each lining section is fashioned with a pair of side wings 6, 6 which are shown herein as of triangular form or shape (see Fig. 3).

When laying the lining sections in the ditch the adjoining ends of the sections are lapped, and then the side wings 6, 6 are folded over the respective edges of the upper lap, to prevent displacement of the lap ends.

The eyelets 3 and the binding tapes 2 strengthen the lining section, and render it more durable, and in addition to the eyelets 3 along the edges of the lining other eyelets 3' may be provided in the body of the lining section so that the securing stakes or pegs 4 may be interspersed over the area of the lining section to securely hold the section against the bottom and side walls of the ditch.

When the water is to be carried for a considerable distance through the ditch before seepage into the ground, it is preferable that the body of the lining section be made up of impervious material, such as canvas or other fabric that has been rubberized, or made water tight in some other acceptable mode of procedure. Or this impervious lining may be provided of canvas of very close texture thus rendering it water-tight. But when the water is to be disposed of for irrigational purposes, by seepage through the lining, as when used in a lateral ditch or furrow, it is necessary that the material be pervious to water, and in this instance, cheese cloth, muslin, or other similar material may be used, through which the water may percolate and gradually be absorbed by the soil beneath the lining.

The lining sections may be of suitable length, and it is obvious that they may be rolled for convenience in storage or transportation, and that they may be with facility laid in the troughs and fastened down, and may also with equal convenience and dispatch be removed when desired.

What I claim is:

An irrigation ditch lining made up of sections of pervious material having overlapping ends, lateral, triangular shaped wings on one end of each section adapted to fold inwardly over the edges at the end of an adjoining section, said sections and wings having perforations to receive stakes for securing the lining of the ditch bottom.

In testimony whereof I affix my signature.

FRANK SULLIVAN.